Patented Sept. 17, 1940

2,215,430

UNITED STATES PATENT OFFICE 2,215,430

AROMATIC SULPHONAMIDE-SUBSTITUTED ANTIMONY COMPOUNDS

Hans Schmidt, Wuppertal-Vohwinkel, Germany, assignor to Winthrop Chemical Company, Inc., New York, N. Y., a corporation of New York No Drawing. Application November 29, 1937, Serial No. 177,059. In Germany December 1, 1936

6 Claims. (Cl. 260—446)

This invention relates to aromatic sulphonamide-substituted antimony compounds and to a process for preparing the same.

The present invention is based on the discovery that aromatic sulphonamide-substituted antimony compounds are distinguished by an excellent healing action in protozoa infection. In particular the sulphonamide substituted aromatic stibonic acids, their salts, the stibine oxides and stibine hydroxides derived therefrom, their salts and complex-salts have proved to be suitable. Compounds of the said kind were not known up to the present.

In accordance with this invention the said antimony compounds are prepared by causing diazo compounds of aromatic sulphonamide-substituted amines to react with trivalent antimony compounds in the usual manner and, if desired, by subjecting the stibonic acids obtained to reduction to the corresponding stibine oxides, respectively, stibine hydroxides. The latter may be transformed with alkalies or substances capable of forming complex salts with antimony compounds, preferably those mentioned in my co-pending U. S. application Ser. No. 671,286 into the water-soluble form.

Suitable sulphonamide-substituted aromatic amines are particularly those of the benzene series. p-aminobenzene-sulphonamide has been proved to be especially advantageous. The aromatic nucleus may contain the most varied substituents except those of acid character which are capable of forming salts, such as the SO₃H or COOH groups. The sulphonamide-substituted aromatic amines may, for instance, bear in the aromatic nucleus alkyl groups, such as the methyl, ethyl or isopropyl group. Further hydroxyl or alkoxy groups may be present. Suitable alkoxy groups are, for instance, the methoxy, ethoxy or the O.CH₂.COOH group. In the latter grouping the hydrogen atom may be replaced by alkali metals or amino groups with salt formation. Also the corresponding amide O.CH₂.CONH₂ may be present. Furthermore amino and substituted amino groups, such as, for example, acyl- or alkyl-amino groups among which, for instance, monomethylamino, monoethylamino, diethylamino, acetylamino groups and the group

NH.CO.NH₂ may be mentioned, may be linked to the aromatic nucleus. Furthermore halogen atoms, such as chlorine or bromine atoms may stand in the aromatic nucleus. The said substituents may be present once or several times. The amino group which is capable of reacting with the trivalent antimony compound may stand in either the p-, m- or o-position to the sulphonamide radical. The best results have, however, been obtained with such compounds in which the reactive amino group is in the p-position.

In the sulphonamide-substituted aromatic amines used as starting materials also the sulphonamide group may be substituted, for instance, by alkyl or aryl groups, such as the methyl, ethyl and phenyl group. The latter substituent may be further substituted, for instance, by amino, sulphamino, acylamino, carboxyl, carbalkoxy and sulphonamide group. Substituents of this kind are by way of example the p-phenylamino, p-phenylacylamino, p-phenylsulphamino, p-toluylamino, and the —CH₂.COOH group. One or both hydrogen atoms of the —SO₂.NH₂ group may be substituted.

Sulphonamide-substituted aromatic amines which are suited as starting materials are, for example, p-aminobenzene-sulphonamide, m-aminobenzene - sulphonamide, 1 - amino -2.5- dimethyl - benzene -4- sulphonamide, 1- amino -3- chlorobenzene-4-sulphonamide, p-aminobenzene-sulphonic acid-dimethylamide, 1-amino-3-ethyl-benzene-4-sulphonic acid-monomethylamide, 1-amino -2- methoxybenzene -4- sulphonamide, 1-amino - 2 - ethoxybenzene - 4 - sulphonamide, p-amino - sulphonic acid - monomethylamide, p-aminobenzene-sulphonic acid-monophenylamide, 1 - amino - 3 - chlorobenzene - 4 - sulphonic acid-mono-(p-phenylamino) -amide, 1-amino-2-methoxybenzene-4-sulphonic acid-mono-(methylene-carboxylic acid)-amide of the following formula

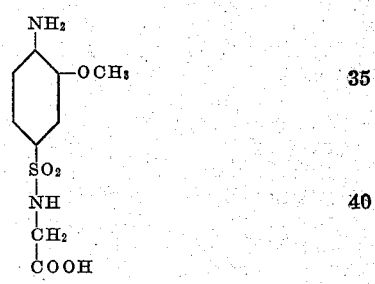

p - aminobenzene - sulphonic acid - mono - (2-methyl-4-acetyl-aminophenyl)-amide, 1-amino-3-hydroxyacetic acid-benzene-4-sulphonamide, and 1-amino-3-hydroxy-acetamide-benzene-4-sulphonamide.

As trivalent antimony compounds may primarily be mentioned antimony trioxide, antimony hydroxide and its salts, such as antimony trichloride as well as, for instance, tartar emetic; preferably antimony hydroxide is used in the freshly precipitated state.

The manufacture of the stibonic acids according to the invention takes place by diazotizing the amine containing the sulphonamide group, adding the antimony compound and neutralizing or rendering alkaline. The reaction is preferably carried out in the presence of polyhydric alcohols, such as glycerine or mannitol. As compounds obtainable by the aforementioned process, there may be mentioned, for instance, p-sulphonamide-phenyl-stibonic acid, p-sulphonic acid-dimethylamide-phenyl-stibonic acid, p-sulphonic acid-monomethylamide-phenyl-stibonic acid, 4-sulphonamide-3.5-dimethyl-phenyl-stibonic acid, p-sulphonamide-o-chloro-phenyl-stibonic acid, m - sulphonamide - phenyl - stibonic acid, 3 - sulphonamide-4-methyl-phenyl-stibonic acid, 3-ethoxy-4-sulphonamide-phenyl-stibonic acid, and p-monophenyl-sulphonamide-phenyl-stibonic acid. The separation and purification of the stibonic acids is effected in the usual manner. They are therapeutically administered in the form of their salts into which they may easily be transformed, for instance, with alkalies or nitrogen bases. Suitable bases are, by way of example, caustic soda lye or diethylamine, diethanolamine, triethanolamine, diethyl-amino-ethanol, and monoethylamine.

The reduction of the stibonic acids in which the antimony is present in the pentavalent form to the trivalent stibine oxides and stibine hydroxides is effected by treatment with the usual reduction agents such as sulphurous acid or stannous chloride. By way of example there may be mentioned as stibine oxides or hydroxides p-sulphonamide-phenyl-stibine oxide, p-sulphonic acid-dimethylamide-phenyl-stibine oxide, di-(4-sulphonamide-3.5-dimethyl-phenyl)-stibine hydroxide, p-sulphonamide-o-chloro-phenyl-stibine oxide, p-sulphonamide-o-anisyl-stibine oxide, m-sulphonamide-phenyl-stibine oxide, and 2-ethoxy-4-sulphonamide-phenyl-stibine oxide.

From the sulphonamide-aryl-stibine oxides, in so far as they are soluble in alkalies, the corresponding salts may be obtained by treatment with alkalies, for example, caustic soda or potassium hydroxide solutions. Soluble salts may, for instance, be obtained from such sulphonamide-aryl-stibine oxides the sulphonamide group of which contains at least one free hydrogen atom. For preparing the said compounds it is therefore necessary to use aminoaryl-sulphonamides which are at the most once substituted in the sulphonamide group.

If the sulphonamide aryl-stibine oxides are not required to be transformed into their salts they may also be transformed into the water-soluble form by complex salt formation. As substances forming complex salts with the sulphonamide-aryl stibine oxides, for instance, benzene derivatives containing at least 2 hydroxyl groups in o-position to each other and at least one acid group, particularly pyrocatechol-sulphonic acids and among them especially pyrocatechol-disulphonic acid may be mentioned. As usual the reaction takes place in the presence of basic substances. As basic substances there may be used an alkali metal, magnesium- or calcium-hydroxide, ammonia or an aliphatic amine, such as diethylamine, diethanolamine, triethanolamine, diethylaminoethanol and monoethylamine.

The invention is illustrated by the following examples without being restricted thereto:

*Example 1*

51 grams of p-aminobenzene-sulphonamide are diazotized and a solution of 50 grams of antimony oxide in 150 ccs. of concentrated hydrochloric acid (to which suitably 50 ccs. of glycerine have been added) is poured in. While vigorously stirring dilute caustic soda lye is added until the reaction mixture is alkaline. After the nitrogen evolution is complete the mixture is neutralized, filtered and the p-sulphonamide-phenyl-stibonic acid is precipitated by acidifying. The sulphonamide-phenyl-stibonic acid is purified in the known manner. It has the formula:

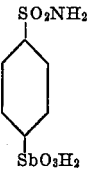

The soluble sodium salt of the stibonic acid may be obtained for instance by neutralization of the stibonic acid with dilute caustic soda in solution in methyl alcohol and precipitating the filtered solution with acetone.

8 grams of the p-sulphonamide-phenyl-stibonic acid or its sodium salt is reduced in dilute methyl alcoholic hydrochloric acid with the addition of some iodine and water, with sulphurous acid. The product of the reduction is precipitated by pouring in water; it is then filtered with suction and washed. The moist paste of the p-sulphonamide-phenyl-stibine oxide is dissolved with exactly the required quantity of dilute caustic soda lye. The solution is filtered and introduced into acetone while stirring. The separated precipitate is taken up in methyl alcohol, the solution is filtered and precipitated in a flocculent form by introducing into ether while stirring. After separation and drying of the precipitate in vacuo the sodium salt of the stibine oxide is obtained as a faintly colored powder which may easily be dissolved in water. The solution yields a light yellow precipitate with dilute hydrochloric acid and hydrogen sulphide. It has the formula:

For transforming the p-sulphonamide-phenyl-stibine oxide into a complex salt the paste of the latter is dissolved in an aqueous solution of 8 grams of pyrocatechol disulphonic acid sodium salt while adding dilute caustic soda lye until the mixture is neutral. The solution is filtered and precipitated by stirring into alcohol. After separation and drying in vacuo of the precipitate the complex salt of the p-sulphonamide-phenyl-stibine oxide is obtained as a faintly colored powder which may easily be dissolved in water. The aqueous solution takes up iodine and yields a light yellow precipitate on addition of hydrochloric acid and hydrogen sulphide. It has the formula:

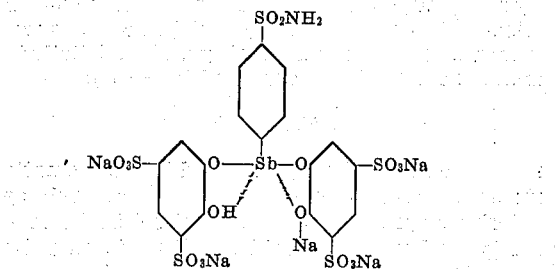

*Example 2*

60 grams of p-aminobenzene-sulphonic acid-dimethylamide are diazotized in a hydrochloric acid solution and caused to react with a solution of antimony oxide in hydrochloric acid and soda lye as described in Example 1. The p-sulphonic acid-dimethylamide-phenylstibonic acid is separated and purified in the usual manner. It may be used, for instance, as its easily soluble sodium salt. It has the formula:

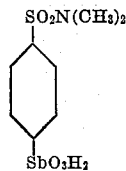

When reducing the said phenyl-stibonic acid in a solution of glacial acetic acid and hydrochloric acid p-sulphonic acid-dimethylamide-phenyl-stibine-chloride is obtained which crystallizes. It melts at 215° C.

By treating it with the sodium salt of pyrogallol-disulphonic acid and a solution of diethylaminoethanol and precipitating the filtered solution with alcohol a neutral complex salt of the p-sulphonic acid-dimethylamide-phenyl-stibine oxide, which is easily soluble in water, is obtained.

In the same manner for instance the p-sulphonic acid monomethylamide-phenyl-stibonic acid can be prepared.

Example 3

20 grams of 1-amino-2.5-dimethylbenzene-4-sulphonamide are diazotized in a hydrochloric acid solution and reacted upon a solution of antimony oxide in dilute hydrochloric acid and soda lye. The 4-sulphonamide-2.5-dimethyl-phenyl-stibonic acid is separated and purified in the usual manner. It may be used, for instance, as its soluble diethylamine salt. It has the formula:

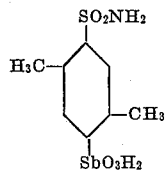

In order to reduce the stibonic acid it is treated in a water containing alcoholic hydrochloric acid with sulphurous acid, the reduction product being precipitated by water and filtered with suction.

In order to convert the product of the reduction into the di-(4-sulphonamide-2.5-dimethylphenyl)-stibine hydroxide of the probable formula:

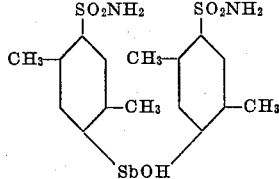

the paste is dissolved in excess soda lye. By standing antimony oxide separates. The solution is filtered and the compound thus formed precipitated by acetic acid. An easily soluble sodium salt of the said diaryl-stibine oxide is obtained by dilution in dilute soda lye and subsequent precipitation.

Example 4 p-amino-m-chlorobenzene-sulphonamide is diazotized in a hydrochloric acid solution and reacted with a solution of antimony-oxide and soda lye as described in Example 1. The p-sulphonamide-o-chlorophenyl-stibonic acid is separated and purified in the usual manner. It may be used in the form of its easily soluble alkali metal- or amine salt. It has the formula:

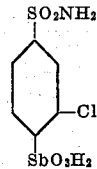

The corresponding trivalent antimony compound can be obtained by reducing the thus obtained p-sulphonamide-o-chlorophenyl-stibonic acid with, for instance, stannous chloride or sulphurous acid.

In the same manner, for instance, p-sulphonamide-o-anisyl-stibonic acid can be prepared.

Example 5

51 grams of m-aminobenzene-sulphonamide are diazotized in a hydrochloric acid solution and reacted in the usual manner with a solution of antimony-oxide and soda lye. The m-sulphonamide-phenyl-stibonic acid obtained is separated and purified in the usual manner. It has the formula:

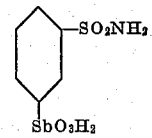

It may be used, for instance, in the form of its easily soluble sodium salt; furthermore it can be subjected to reduction in the same manner as the p-sulphonamide-phenyl-stibonic acid described in Example 1.

I claim:

1. Aromatic sulphonamide-substituted antimony compounds selected from the group consisting of sulphonamide-substituted phenylstibonic acids, sulphonamide-substituted phenylstibonic acid salts selected from the group consisting of alkali-metal and amine salts, sulphonamide-substituted phenylstibine oxides and sulphonamide-substituted phenylstibine hydroxides.

2. Aromatic sulphonamide-substituted antimony compounds selected from the group consisting of sulphonamide-substituted phenylstibonic acids, sulphonamide-substituted phenylstibonic acid salts selected from the group consisting of alkali-metal and amine salts, sulphonamide-substituted phenylstibine oxides and sulphonamide-substituted phenylstibine hydroxides wherein at least one of the hydrogen atoms of the sulphonamide group is substituted by a radical selected from the group consisting of an alkyl and aryl radical.

3. Aromatic sulphonamide-substituted antimony compounds selected from the group consisting of sulphonamide-substituted phenylstibonic acids, sulphonamide-substituted phenylstibonic acid salts selected from the group consisting of alkali-metal and amine salts, sulphonamide-substituted phenylstibine oxides and sulphonamide-substituted phenylstibine hydroxides wherein at the most one of the hydrogen atoms of the sulphonamide group is substituted by a substituent selected from the group consisting of alkyl and aryl radicals.

4. Aromatic p-sulphonamide-substituted antimony compounds selected from the group consisting of p-sulphonamide-substituted phenylstibonic acids, p-sulphonamide-substituted stibonic acid salts selected from the group consisting of alkali-metal and amine salts, p-sulphonamide-substituted phenylstibine oxides and p-sulphonamide-substituted phenylstibine hydroxides.

5. Aromatic p-sulphonamide-substituted antimony compounds selected from the group consisting of p-sulphonamide-substituted phenylstibonic acids, p-sulphonamide-substituted phenylstibonic acid salts selected from the group consisting of alkali-metal and amine salts, p-sulphonamide-substituted phenylstibine oxides and p-sulphonamide substituted phenylstibine hydroxides wherein the aromatic nucleus is substituted by a radical selected from the group consisting of alkyl, hydroxy, alkoxy, amino group and amino groups substituted by a radical selected from the group consisting of an alkyl and aryl radical and halogen atoms.

6. The aromatic sulphonamide-substituted antimony compound of the formula:

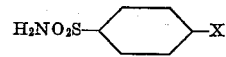

wherein X stands for a radical selected from the group consisting of stibonic acids, stibonic acid salts selected from the group consisting of alkali-metal and amine salts, and stibine oxide.

HANS SCHMIDT.